(12) United States Patent
Kuchnio et al.

(10) Patent No.: US 10,764,560 B2
(45) Date of Patent: Sep. 1, 2020

(54) SYSTEM FOR THREE-DIMENSIONAL VISUALIZATION

(71) Applicant: Synaptive Medical (Barbados) Inc., Bridgetown (BB)

(72) Inventors: Piotr Kuchnio, Toronto (CA); Christopher Thomas Jamieson, Toronto (CA); Siu Wai Jacky Mak, Toronto (CA); Tammy Kee-Wai Lee, Toronto (CA); Yusuf Bismilla, Toronto (CA); Sam Anthony Leitch, Toronto (CA)

( * ) Notice: Subject to any disclaimer, the term of this patent is extended or adjusted under 35 U.S.C. 154(b) by 0 days.

(21) Appl. No.: 16/263,128

(22) Filed: Jan. 31, 2019

(65) Prior Publication Data

US 2019/0238822 A1 Aug. 1, 2019

(51) Int. Cl.
| | |
|---|---|
| *H04N 13/25* | (2018.01) |
| *H04N 13/246* | (2018.01) |
| *H04N 13/122* | (2018.01) |
| *H04N 13/282* | (2018.01) |

(Continued)

(52) U.S. Cl.
CPC .......... *H04N 13/25* (2018.05); *H04N 13/122* (2018.05); *H04N 13/239* (2018.05); *H04N 13/246* (2018.05); *H04N 13/282* (2018.05); *H04N 13/296* (2018.05)

(58) Field of Classification Search
CPC .... H04N 13/25; H04N 13/282; H04N 13/122; H04N 13/246; H04N 13/296; H04N 13/239
See application file for complete search history.

(56) References Cited

U.S. PATENT DOCUMENTS

| 9,602,811 B2* | 3/2017 | Hillebrand | ........... H04N 13/243 |
| 9,880,457 B2* | 1/2018 | Maier | .................... G03B 35/10 |
| 9,948,919 B2* | 4/2018 | Jin | ..................... H04N 5/23267 |

(Continued)

OTHER PUBLICATIONS

An et al. Interaxial Distance and Convergence Control for Efficient Stereoscopic Shooting using Horizontal Moving 3D Camera Rig, World Academy of Science, Engineering and Technology International Journal of Electrical and Computer Engineering vol. 5, No. 11, 2011 (Year: 2011).*

(Continued)

*Primary Examiner* — Richard A Hansell, Jr.
(74) *Attorney, Agent, or Firm* — Thanh V. Vuong

(57) ABSTRACT

A system for producing 3D video using first and second cameras on first and second axes. The second camera has a field of view (FOV) overlapping with the first camera's FOV. The second axis is at a convergence angle relative to the first axis. A control computer changes the inter-camera distance by effectively moving the second camera laterally, and changes convergence angle by effectively rotating the second camera. The control computer automatically calculates the inter-camera distance and convergence angle based on the distance of a user to the display screen, working distance of the cameras, zoom settings, and size of the screen, and effectively moves the second camera accordingly. A keystone correction is performed to account for the camera projections, the frames are rotationally aligned, and the corrected/aligned frames are combined to produce a 3D image frame that is displayed on a 3D display screen.

11 Claims, 8 Drawing Sheets

(51) Int. Cl.
 *H04N 13/239* (2018.01)
 *H04N 13/296* (2018.01)

(56) References Cited

U.S. PATENT DOCUMENTS

| | | | |
|---|---|---|---|
| 10,009,541 B2* | 6/2018 | Jayaram | H04N 5/2253 |
| 2008/0049100 A1* | 2/2008 | Lipton | H04N 13/144 |
| | | | 348/43 |
| 2011/0243543 A1* | 10/2011 | Pace | G03B 35/08 |
| | | | 396/325 |
| 2012/0182397 A1* | 7/2012 | Heinzle | H04N 13/239 |
| | | | 348/47 |
| 2014/0285632 A1* | 9/2014 | Lim | A61B 90/50 |
| | | | 348/47 |
| 2016/0366394 A1* | 12/2016 | Park, II | H04N 13/296 |

OTHER PUBLICATIONS

Ponto et al. "Perceptual Calibration for Immersive Display Environments", IEEE Trans Vis Comput Graph. Apr. 2013 ; 19(4): 691-700. doi:10.1109/TVCG.2013.36. (Year: 2013).*

* cited by examiner

SYSTEM FOR THREE-DIMENSIONAL VISUALIZATION

FIELD OF THE INVENTION

The present invention relates generally to systems and methods for three-dimensional visualization, and more particularly systems and methods for three-dimensional visualization of surgery in real-time.

BACKGROUND OF THE INVENTION

In the field of medicine, imaging and image guidance are a significant component of clinical care. From diagnosis and monitoring of disease, to planning of the surgical approach, to guidance during procedures and follow-up after the procedure is complete, imaging and image guidance provides effective and multifaceted treatment approaches, for a variety of procedures, including surgery and radiation therapy. Targeted stem cell delivery, adaptive chemotherapy regimes, surgical tumour resection and radiation therapy are only a few examples of procedures utilizing imaging guidance in the medical field.

Real-time imagery of tissue being operated on may be generated by a surgical imaging system. Typically this is a sequence of images forming a video stream that is updated as a surgical operation is performed. Often there is a particular feature in the imagery that is the subject of the operation such as a glioma, white matter tracts, tendons, ligaments or muscle fibers. It may be very important for the surgeon to be able to distinguish different portions of the feature and distinguish the feature from surrounding tissue. However, while the feature may have distinguishing colour characteristics in colour imagery, it may be difficult for the surgeon to see such distinctions in a typical image or video stream.

In a stereoscopic camera system, the three-dimensional (3D) effect experienced by the viewer is determined by the inter-ocular separation and convergence angle of the camera system. As seen in FIG. 1, the inter-ocular separation is the distance ("d") between the two cameras. The convergence angle, or parallax angle, ($\theta$) is the angle away from perpendicular of the camera.

As the inter-ocular separation increases, the 3D depth effect increases as well. The convergence angle determines which plane in the image defines the flat, or z=0 location. Areas below this plane look like they are receding into the display, whereas areas above the plane appear as if they are 'popping out' of the display. A particular set of inter-ocular separation and convergence angles leads to a pleasing and realistic picture for the viewer.

The above is only strictly true at one particular magnification, working distance, display size, and position of the observer relative to the display. Fundamentally, all four of these 'perceived' parameters affect the perception of 3D because they change the disparity as it appears to the viewer.

For example, as the viewer moves closer to the screen, the 3D depth effect is compressed. The same is true for magnification (as you zoom in, the images and hence their separation as a percentage of the field of view increases). Changing the working distance is simply another way of changing the magnification (e.g. as the camera moves closer, the image size increases). Finally, the display size affects the perceived disparity since the smaller the display the smaller the perceived separation.

Eye fatigue with a 3D surgical microscope system is a significant challenge for surgeons who often operate for multiple hours. For example, spinal surgeons and neurosurgeons may operate for 8 to 12 hours or more in a complicated case. Moreover, visual functions vary greatly from person to person. In particular, there are limits to the binocular parallax of left and right images that a person can fuse into one 3D image in the brain. Some people can converge and generate 3D images very easily while approximately 3-15% of the population have stereo blindness or stereo impairment. A significant percentage people cannot see 3D at all because of vision loss in one eye or because of the loss of the muscular ability to converge and focus both eyes on any point on their visual field. One in six people have stereo impairment who might have convergence challenges like strabismus, or asymmetric visual acuity.

SUMMARY OF THE INVENTION

In a typical operating room environment, the position and magnification of the visualization system, the display, and the surgeon are not static and are not known in advance. Therefore, it is highly preferable that the tuning of these parameters for an optimal presentation be dynamic. Furthermore, failing to get the parameters correct can result in a 3D image that is painful to view, or even possibly a 3D image that cannot be fused by the brain.

When operating a stereoscopic visualization system there are a number of system configuration parameters which must remain in either constant or relative calibration to maintain both a good 3D image (maintain 3D image fusion) and keep user fatigue to an acceptable level. These include but are not limited to focus, inter-ocular distance, colour calibration, and 3D geometry.

Using a processor, various aspects of the 3D input from a 3D optical system are measured and then these readings are used to adjust the settings and apply processing corrections. These readings include but are not limited to relative focus, inter-ocular distance based on zoom, zoom disparity between channels, colour matching, and alignment. These measurements may be used to control the 3D optical system and image processing blocks, accordingly removing the need for frequent calibration.

Maximizing viewing quality and duration without eye fatigue is key in a 3D microscope. Bad stereoscopy can potentially cause stereo blindness. Therefore, it is important to know and take account of the range of binocular parallax over which the surgeon or surgeons performing an operation can converge two images to generate a 3D image. The requirements to produce the best and longest 3D viewing experience varies from surgeon to surgeon. To produce the best and most comfortable viewing experience and duration for use in surgery, the 3D system should to be calibrated and optimized, at the time of operation, for the one or few operating surgeons. Such optimization must be based on their natural and anatomical ability (e.g. level of convergence, inter-ocular distance) to converge 3D images and the setting of the operating theater (e.g. viewing distance to the screen, viewing angle) in addition to the system specifications (e.g. working distance, magnification, screen size, screen resolution).

The system optimizes the 3D imagery for only one or a small number of surgeons at a time. Others in the operating room can alternatively view the surgery through 2D monitors or separate 3D monitors optionally.

In preferred embodiments, the invention provides a system for producing three-dimensional (3D) video data, the video data comprising a sequence of 3D image frames at a frame rate for display on a 3D display screen having a location. The system includes first and second cameras and a control computer. A first video camera is configured to capture a first sequence of image frames at the frame rate. The first camera has a first field of view having a center and a first axis extending in a forward direction through the center of the first field of view. A second video camera is configured to capture a second sequence of image frames at the frame rate. The second video camera is spaced apart from the first camera in a lateral direction perpendicular to the forward direction by an inter-camera distance. The second camera has a second field of view substantially overlapping with the first field of view. The second field of view has a second axis at a convergence angle relative to the first axis.

The control computer is operatively connected to the second video camera configured to change the inter-camera distance by effectively moving the second video camera laterally, and to change the convergence angle by effectively rotating the second video camera, wherein the control computer automatically calculates the inter-camera distance and convergence angle based on the distance of a user to the display screen, working distance of the video cameras, zoom settings of the cameras, and size of the display screen, and effectively moves the second camera accordingly, For each set of first and second sequences of image frames, the control computer is configured to perform a keystone correction on the image frames to account for the different projections of each camera, rotationally align corresponding image frames in the first and second sequences, combine the corrected and aligned frames to produce a 3D image frame, and display the sequence of 3D image frames on the 3D display screen.

The control computer may also be operatively connected to the first video camera and be further configured to change the inter-camera distance by effectively moving the first and second video cameras relative to each other.

The control computer may calculate the inter-camera distance and convergence angle based on preferences specified by the user.

The user may a surgeon who is going to perform surgery on a patient while viewing the 3D display screen. Then, the control computer may be further configured to perform a pre-surgery calibration to assess how the surgeon perceives depth, and the calculation of the inter-camera distance and convergence angle may be further based on the assessment. The control computer may obtain the results of a stereoacuity test performed by the surgeon and automatically adjust the convergence angle and inter-camera distance to achieve a disparity that is comfortable for the surgeon based on the results of the stereoacuity test. The stereoacuity test may be a Howard-Dohlman stereoacuity test. The the control computer may administer the Howard-Dohlman stereoacuity test to the surgeon.

The user may be a surgeon who is perform surgery on a patient while viewing the 3D display screen. One of the hands of the surgeon holding a surgical instrument and tissue of the patient being treated using the surgical instrument may then be visible in the overlapping fields of view of the cameras. Then the system may further comprise a navigation system configured to track the position of the surgical instrument relative to the tissue, and the control computer may be further configured to receive real-time information indicating the position of the surgical instrument and optimize the 3D image frames based on the position of the surgical instrument, the position of the surgeon and the location and angle of the 3D display screen. The system may dynamically change the convergence angle to maintain a tip of the surgical instrument at a convergence point corresponding to the location and angle of the 3D display screen with respect to the surgeon.

The control computer may effectively move the second video camera laterally by instructing a motorized mechanism to physically move the second video camera laterally and may effectively rotate the second video camera by instructing a second motorized mechanism to physically rotate the second video camera.

The control computer may effectively move the second video camera laterally by a distance by digitally processing the image frames so that they appear as they would appear if the second camera had been physically moved laterally by that distance.

The control computer may effectively rotate the second video camera by an angle by digitally processing the image frames so that they appear as they would appear if the second camera had been physically rotated by that angle.

BRIEF DESCRIPTION OF THE DRAWINGS

In the figures, the following abbreviations are used.
$C_1$=Camera 1, $C_2$=Camera 2, CD=Inter camera distance
$c_1p_1$=projection of p1 onto c1, $c_1p_2$=project of p2 onto c1
$c_2p_1$=projection of p1 onto c2, $c_2p_2$=projection of p2 onto c2, $c_2p_2$=project of p3 onto c_2
$\theta_1$=Camera 1 field of view (FOV), $\theta_2$=Camera 2 FOV
$\phi$=Parallax Angle
WD=Nominal Working Distance
$FOV_1$=Camera 1 FOV, $FOV_2$=Camera 2 FOV, FOV=Display FOV
d=Display width, z=user distance to display, PD=Inter-pupil distance
dp1=display disparity of p1, dp2=display disparity of p2, dp3=display disparity of p3 relative to p2
X=User defined depth comfort
HIT=Horizontal Image Translation

DETAILED DESCRIPTION OF THE INVENTION

Figure 1:
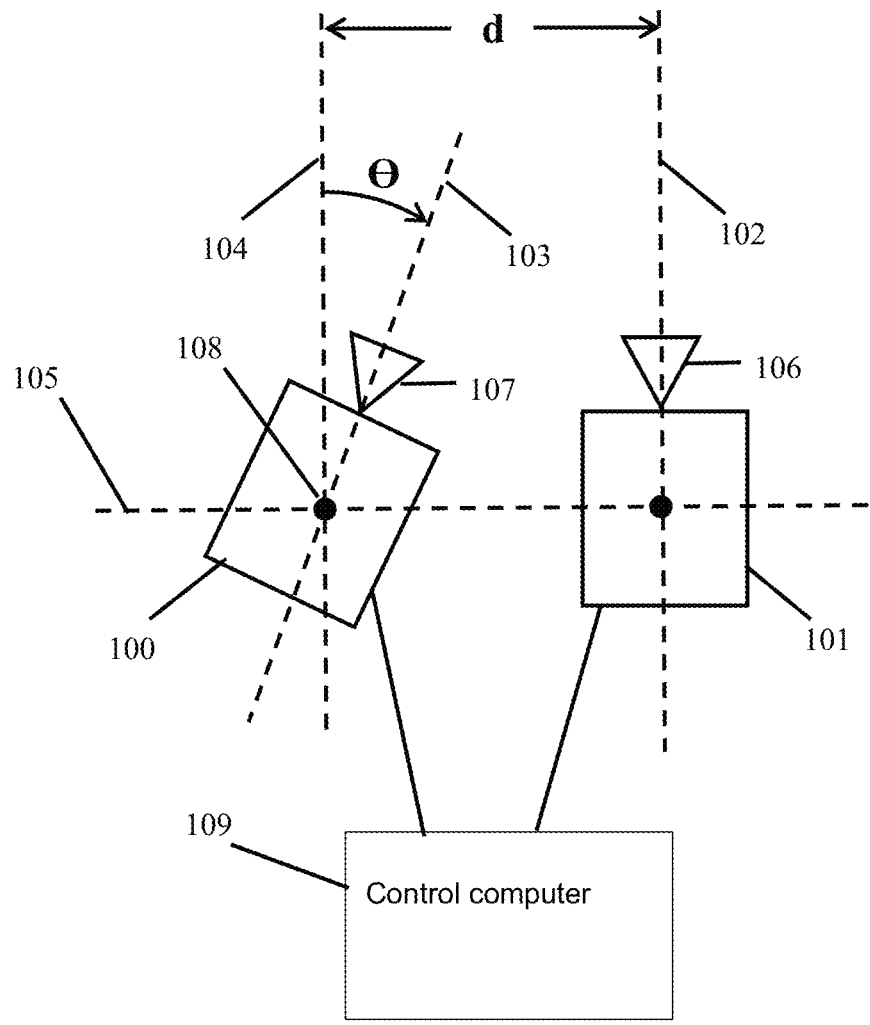
FIG. 1 is a block diagram of a stereoscopic video imaging system showing two cameras.

In various examples, the present disclosure describes an example three-dimensional (3D) visualization system that may help to address some of the challenges discussed above. FIG. 1 is a simple block diagram of example digital video cameras 100, 101 that may be used in the visualization system. The first camera 101 has a field of view with a first axis 102 extending in a forward direction through the center of the field of view. The direction of the field of view of the first camera 101 is indicated as a triangle 106. Similarly, the second camera 100 has a field of view with a first axis 103 extending in a forward direction through the center of its field of view. The direction of the field of view of the second camera 100 is indicated as a triangle 107. A forward axis 104 through the center of the second camera 100, which is parallel to the first axis 102, is also shown.

The second axis 103 is at an angle, referred to as theta (θ) in FIG. 1, relative to the forward direction. Generally, theta is an acute angle greater than zero degrees. Theta may be referred to as the parallax angle or the convergence angle. The cameras are spaced apart by an inter-camera distance, d, in the lateral direction 105 perpendicular to the forward direction and the first axis 102.

The second camera 100 may be mechanically rotatable, for example about its center point 108 under the control of a control mechanism that is part of the visualization system in order to change the convergence angle. The control mechanism may also be configured to vary the inter-camera distance, d, by moving one or both of the cameras in the lateral direction 105. The control mechanism employs a computer processor, programmed by software, and is configured to be in electronic communication with the cameras.

The cameras 100, 101 preferably have optical zoom capabilities to allow the focal length to be changed, thereby changing the field of view. In the 3D visualization system, the two cameras are configured with the same zoom settings, and when the focal length of one is changed, the focal length of the other is simultaneously changed. The control mechanism may also be configured to electronically control and vary the zoom settings of the cameras, generally increasing or decreasing the zoom simultaneously at the same rate.

The visualization system also includes a control computer 109 that is in electronic communication with the cameras 100, 101. The control computer 109 includes at least one computer processor running software. The control computer 109 preferably includes the control mechanism discussed above. The control computer 109 is configured to receive digital imagery from the cameras and runs software configured process the imagery to produce 3D images. Some or all of the image processing may alternatively be done in hardware, for example using field-programmable gate arrays (FPGAs).

In some embodiments, the control computer 109 may implement the control system functions in software and may comprise a video processing computer. For example, by appropriate processing of a pair of images received from the cameras, the control computer 109 may effectively change the inter-camera distance or change the convergence angle.

The systems and methods described herein may be useful in the field of neurosurgery, including oncological care, neurodegenerative disease, stroke, brain trauma and orthopedic surgery. The teachings of the present disclosure may be applicable to other conditions or fields of medicine. It should be noted that while the present disclosure describes examples in the context of neurosurgery, the present disclosure may be applicable to other surgical procedures that may use intraoperative optical imaging.

Various example apparatuses or processes will be described below. No example embodiment described below limits any claimed embodiment and any claimed embodiments may cover processes or apparatuses that differ from those examples described below. The claimed embodiments are not limited to apparatuses or processes having all of the features of any one apparatus or process described below or to features common to multiple or all of the apparatuses or processes described below. It is possible that an apparatus or process described below is not part of any claimed embodiment.

Furthermore, numerous specific details are set forth in order to provide a thorough understanding of the disclosure. However, it will be understood by those of ordinary skill in the art that the embodiments described herein may be practiced without these specific details. In other instances, well-known methods, procedures and components have not been described in detail so as not to obscure the embodiments described herein.

Figure 2A:
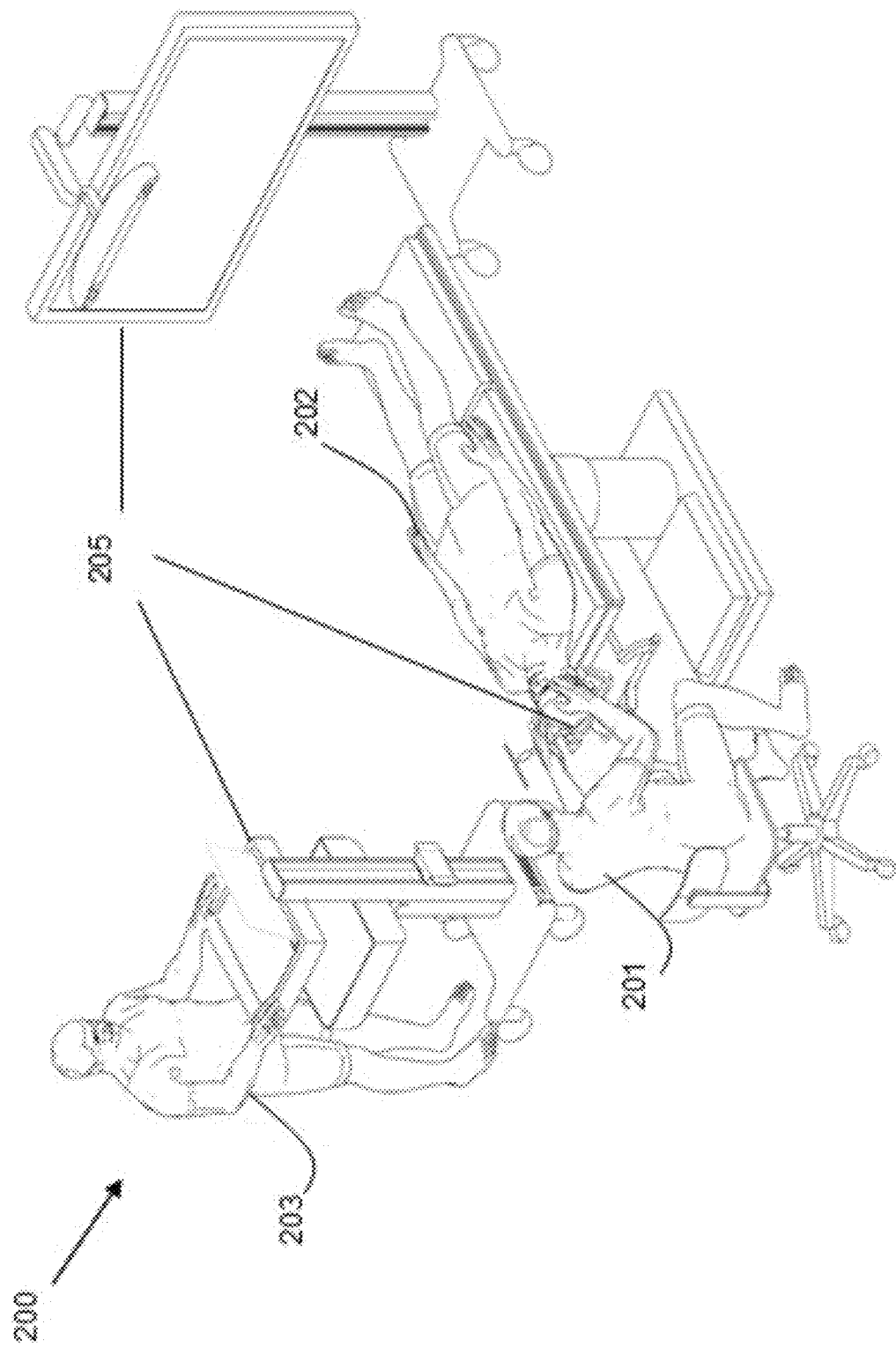
FIG. 2a shows an example navigation system to support image guided surgery.

In FIG. 2A, an exemplary navigation system environment 200 is shown, which may be used to support navigated image-guided surgery. As shown in FIG. 2A, surgeon 201 conducts a surgery on a patient 202 in an operating room (OR) environment. A medical navigation system 205 may include an equipment tower, tracking system, displays and tracked instruments to assist the surgeon 201 during his procedure. An operator 203 may also be present to operate, control and provide assistance for the medical navigation system 205.

Figure 2B:
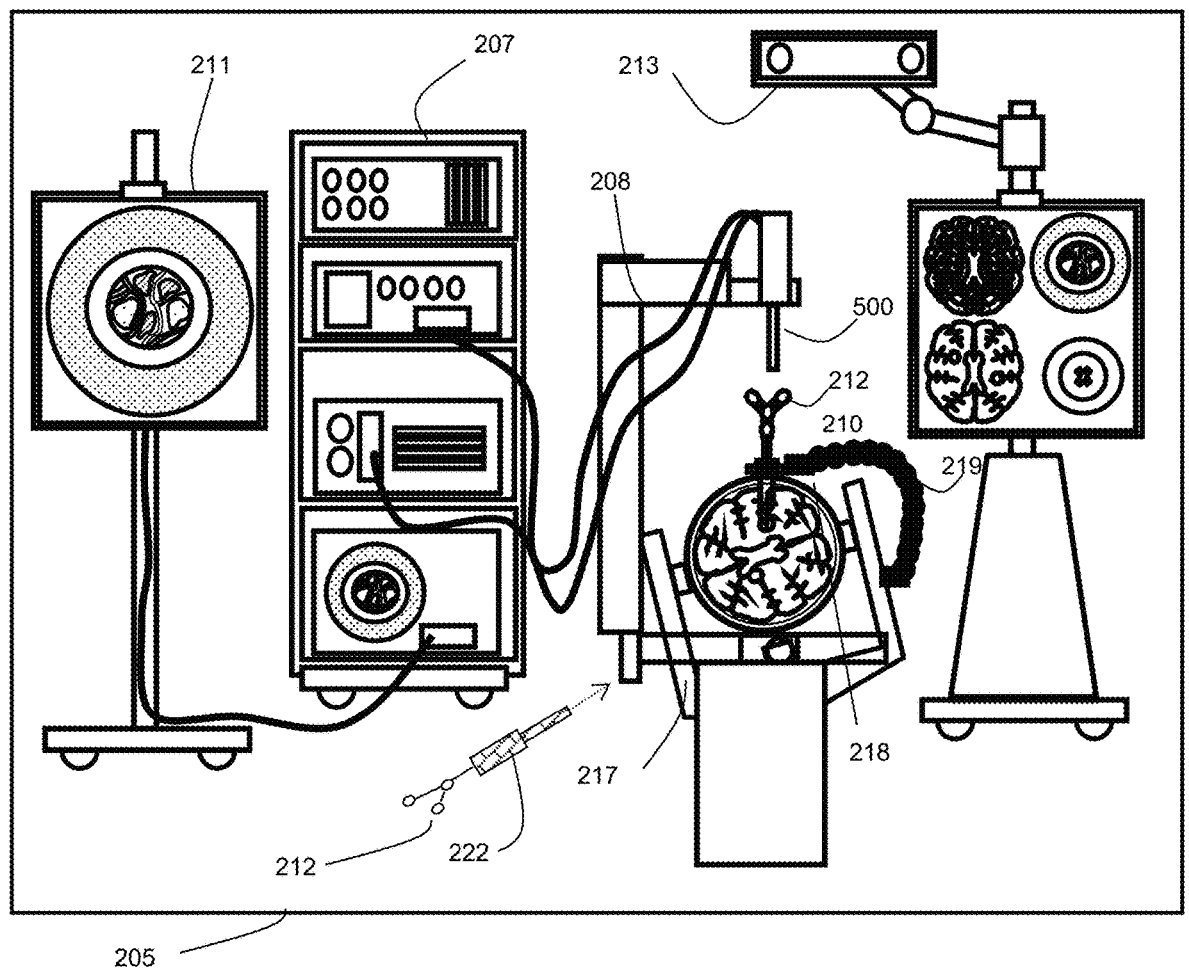
FIG. 2b is a diagram illustrating system components of an example navigation system.

FIG. 2B shows a diagram illustrating an example medical navigation system 205 in greater detail. The disclosed optical imaging system may be used in the context of the medical navigation system 205. The medical navigation system 205 may include one or more displays 206, 211 for displaying a video image, an equipment tower 207, and a positioning system 208, such as a mechanical arm, which may support an optical imaging system 500 (which may include an optical scope). One or more of the displays 206, 211 may include a touch-sensitive display for receiving touch input. The equipment tower 207 may be mounted on a frame (e.g., a rack or cart) and may contain a power supply and a computer or controller that may execute planning software, navigation software and/or other software to manage the positioning system 208 one or more instruments tracked by the navigation system 205. In some examples, the equipment tower 207 may be a single tower configuration operating with dual displays 206, 211, however other configurations may also exist (e.g., dual tower, single display, etc.). Furthermore, the equipment tower 207 may also be configured with a universal power supply (UPS) to provide for emergency power, in addition to a regular AC adapter power supply.

A portion of the patient's anatomy may be held in place by a holder. For example, as shown the patient's head and brain may be held in place by a head holder 217. An access port and associated introducer 210 may be inserted into the head, to provide access to a surgical site in the head. The imaging system may be used to view down the access port at a sufficient magnification to allow for enhanced visibility down the access port. The output of the imaging system may be received by one or more computers or controllers to generate a view that may be depicted on a visual display (e.g., one or more displays 206, 211).

In some examples, the navigation system 205 may include a tracked pointer 222. The tracked pointer 222, which may include markers 212 to enable tracking by a tracking camera 213, may be used to identify points (e.g., fiducial points) on a patient. An operator, typically a nurse or the surgeon 201, may use the tracked pointer 222 to identify the location of points on the patient 202, in order to register the location of selected points on the patient 202 in the navigation system 205. It should be noted that a guided robotic system with closed loop control may be used as a proxy for human interaction. Guidance to the robotic system may be provided by any combination of input sources such as image analysis, tracking of objects in the operating room using markers placed on various objects of interest, or any other suitable robotic system guidance techniques.

Fiducial markers 212 may be connected to the introducer 210 for tracking by the tracking camera 213, which may provide positional information of the introducer 210 from the navigation system 205. In some examples, the fiducial markers 212 may be alternatively or additionally attached to the access port 12. In some examples, the tracking camera 213 may be a 3D infrared optical tracking stereo camera similar to one made by Northern Digital Imaging (NDI). In some examples, the tracking camera 213 may be instead an electromagnetic system (not shown), such as a field transmitter that may use one or more receiver coils located on the tool(s) to be tracked. A known profile of the electromagnetic field and known position of receiver coil(s) relative to each other may be used to infer the location of the tracked tool(s) using the induced signals and their phases in each of the receiver coils. Operation and examples of this technology is further explained in Chapter 2 of "Image-Guided Interventions Technology and Application," Peters, T.; Cleary, K., 2008, ISBN: 978-0-387-72856-7, incorporated herein by reference. Location data of the positioning system 208 and/or access port 12 may be determined by the tracking camera 213 by detection of the fiducial markers 212 placed on or otherwise in fixed relation (e.g., in rigid connection) to any of the positioning system 208, the access port, the introducer 210, the tracked pointer 222 and/or other tracked instruments. The fiducial marker(s) 212 may be active or passive markers. A display 206, 211 may provide an output of the computed data of the navigation system 205. In some examples, the output provided by the display 206, 211 may include axial, sagittal and coronal views of patient anatomy as part of a multi-view output.

The active or passive fiducial markers 212 may be placed on tools (e.g., the access port and/or the imaging system) to be tracked, to determine the location and orientation of these tools using the tracking camera 213 and navigation system 205. The markers 212 may be captured by a stereo camera of the tracking system to give identifiable points for tracking the tools. A tracked tool may be defined by a grouping of markers 212, which may define a rigid body to the tracking system. This may in turn be used to determine the position and/or orientation in 3D of a tracked tool in a virtual space. The position and orientation of the tracked tool in 3D may be tracked in six degrees of freedom (e.g., x, y, z coordinates and pitch, yaw, roll rotations), in five degrees of freedom (e.g., x, y, z, coordinate and two degrees of free rotation), but preferably tracked in at least three degrees of freedom (e.g., tracking the position of the tip of a tool in at least x, y, z coordinates). In typical use with navigation systems, at least three markers 212 are provided on a tracked tool to define the tool in virtual space, however it is known to be advantageous for four or more markers 212 to be used.

Figure 3:
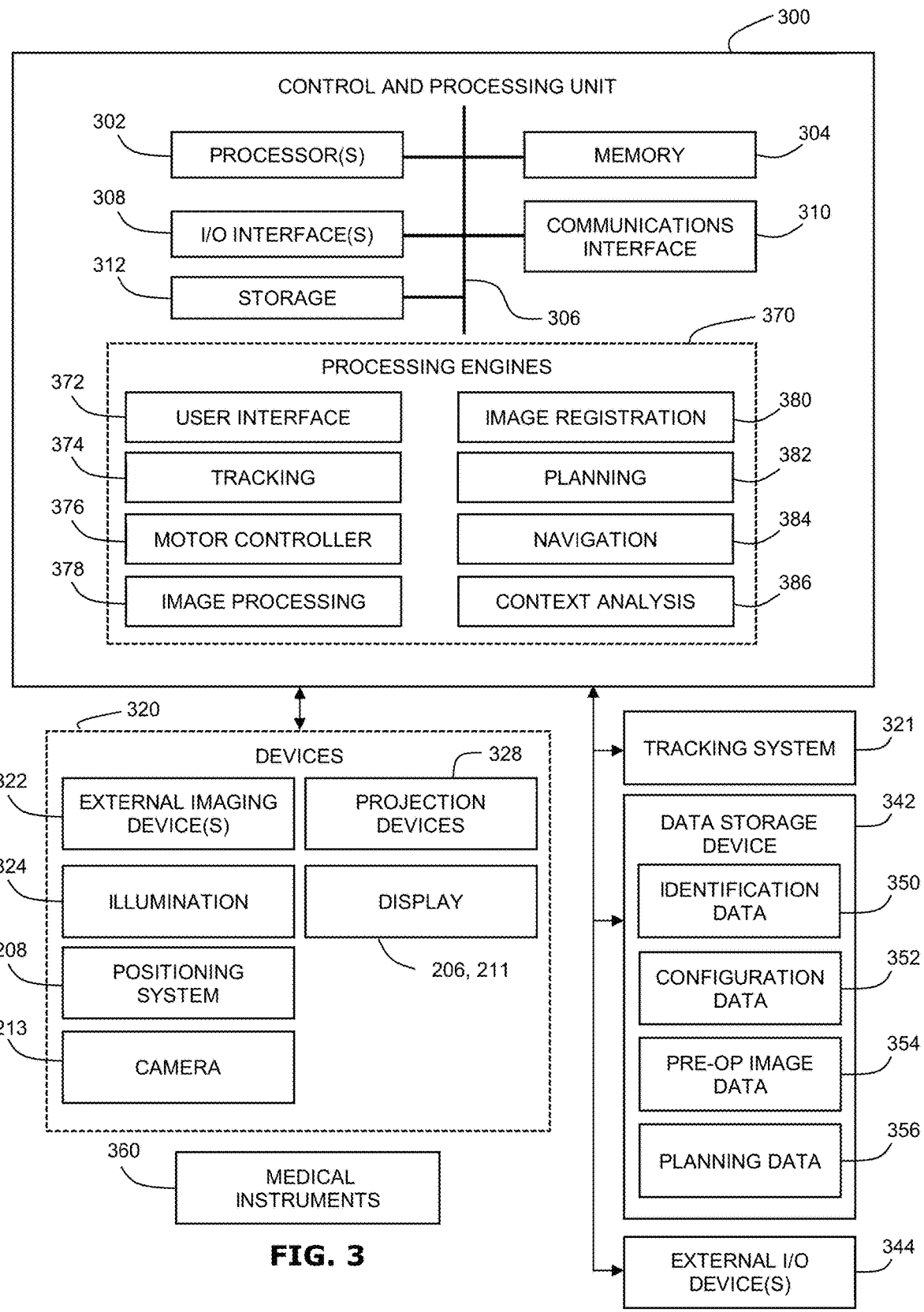
FIG. 3 is a block diagram illustrating an example control and processing system that may be used in the example navigation systems of FIGS. 2A and 2B.

FIG. 3 is a block diagram illustrating a control and processing system 300 that may be used in the medical navigation system 205 shown in FIG. 2B (e.g., as part of the equipment tower 207). As shown in FIG. 3, in one example, control and processing system 300 may include one or more processors 302, a memory 304, a system bus 306, one or more input/output interfaces 308, a communications interface 310, and storage device 312. The control and processing system 300 may be interfaced with other external devices, such as a tracking system 321, data storage 342, and external user input and output devices 344, which may include, for example, one or more of a display, keyboard, mouse, sensors attached to medical equipment, foot pedal, and microphone and speaker. Data storage 342 may be any suitable data storage device, such as a local or remote computing device (e.g. a computer, hard drive, digital media device, or server) having a database stored thereon. In the example shown in FIG. 3, data storage device 342 includes identification data 350 for identifying one or more medical instruments 360 and configuration data 352 that associates customized configuration parameters with one or more medical instruments 360. The data storage device 342 may also include preoperative image data 354 and/or medical procedure planning data 356. Although the data storage device 342 is shown as a single device in FIG. 3, it will be understood that in other embodiments, the data storage device 342 may be provided as multiple storage devices.

The medical instruments 360 may be identifiable by the control and processing unit 300. The medical instruments 360 may be connected to and controlled by the control and processing unit 300, or the medical instruments 360 may be operated or otherwise employed independent of the control and processing unit 300. The tracking system 321 may be employed to track one or more medical instruments 360 and spatially register the one or more tracked medical instruments to an intraoperative reference frame. For example, the medical instruments 360 may include tracking markers such as tracking spheres that may be recognizable by the tracking camera 213. In one example, the tracking camera 213 may be an infrared (IR) tracking camera. In another example, as sheath placed over a medical instrument 360 may be connected to and controlled by the control and processing unit 300.

The control and processing unit 300 may also interface with a number of configurable devices, and may intraoperatively reconfigure one or more of such devices based on configuration parameters obtained from configuration data 352. Examples of devices 320, as shown in FIG. 3, include one or more external imaging devices 322, one or more illumination devices 324, the positioning system 208, the tracking camera 213, one or more projection devices 328, and one or more displays 206, 211.

Exemplary aspects of the disclosure can be implemented via the processor(s) 302 and/or memory 304. For example, the functionalities described herein can be partially implemented via hardware logic in the processor 302 and partially using the instructions stored in the memory 304, as one or more processing modules or engines 370. Example processing modules include, but are not limited to, a user interface engine 372, a tracking module 374, a motor controller 376, an image processing engine 378, an image registration engine 380, a procedure planning engine 382, a navigation engine 384, and a context analysis module 386. While the example processing modules are shown separately in FIG. 3, in some examples the processing modules 370 may be stored in the memory 304 and the processing modules 370 may be collectively referred to as processing modules 370. In some examples, two or more modules 370 may be used together to perform a function. Although depicted as separate modules 370, the modules 370 may be embodied as a unified set of computer-readable instructions (e.g., stored in the memory 304) rather than distinct sets of instructions.

It is to be understood that the system is not intended to be limited to the components shown in FIG. 3. One or more components of the control and processing system 300 may be provided as an external component or device. In one example, the navigation module 384 may be provided as an external navigation system that is integrated with the control and processing system 300.

Some embodiments may be implemented using the processor 302 without additional instructions stored in memory 304. Some embodiments may be implemented using the instructions stored in memory 304 for execution by one or more general purpose microprocessors. Thus, the disclosure is not limited to a specific configuration of hardware and/or software.

3D Visualization

A surgical navigation system, as discussed above, can be used to track the position of the visualization system. We can infer the position of the surgeon from the tracked location of the tools (e.g. tracked pointer, tracked port, or tracked suction). The patient reference frame could also be used for this information since the surgeon operates in close proximity to the patient. The size of the display is known. The approximate position of the display relative to the positioner and the tools is known as well.

In a system with motorized zoom, a computer system 109 monitors and transmits the current zoom information. Since the tool and the positioner are tracked by the navigation camera, the working distance from the tool to the camera is known as well.

This information is transmitted to a computer processor in the control computer 109. The processor calculates the required inter-ocular separation and convergence angle based on (1) optical zoom, (2) optical working distance, (3) distance of surgeon to display, and (4) size of display The adjustments to the inter-ocular distance can be made by image post-processing (e.g. via a video processing computer) or mechanically (via a motorized stage that controls the camera horizontal separation). The camera convergence angle can be changed mechanically via a motorized rotation stage.

An image processing system continuously applies a warp to the images from both eyes based on the current geometry of the system and operating room.

As the robotic positioning system changes its working distance, commands are sent to the image processor to update the horizontal image translation (HIT) based on the new working distance. The HIT is the principal method in which 3D perception is altered in image post-processing of stereo images.

At the start of a procedure, the system checks the position of the monitor and of the patient reference, using this as one approximation of surgeon to display length. This viewing distance is used as a parameter in the horizontal image translation applied to the camera. The viewing distance may be fed from external devices such as glasses or estimated from tracked tools or location of the device positioner or eye tracker.

The size of the display is a parameter that can be entered at the start of the case. Alternatively, it may be a configuration parameter created at installation time or manufacturing time.

Different horizontal translations may be applied to different displays in the case of a multi-display operating room arrangement.

Depending on procedure type or surgeon preference, the HIT can be changed to compress (decrease perception of depth) or expand (increase the perception of depth). This can be exposed on the user interface.

One embodiment of this technique is known as maintaining the "ortho-stereo condition", i.e. the field of view as seen by the image sensor through the lens spans the same field of view as the viewer looking at the screen. If the ortho-stereo condition is maintained, then the display will be perfectly reproducing what is captured by the camera. This is the condition the system aims to maintain as a baseline.

Figure 5:
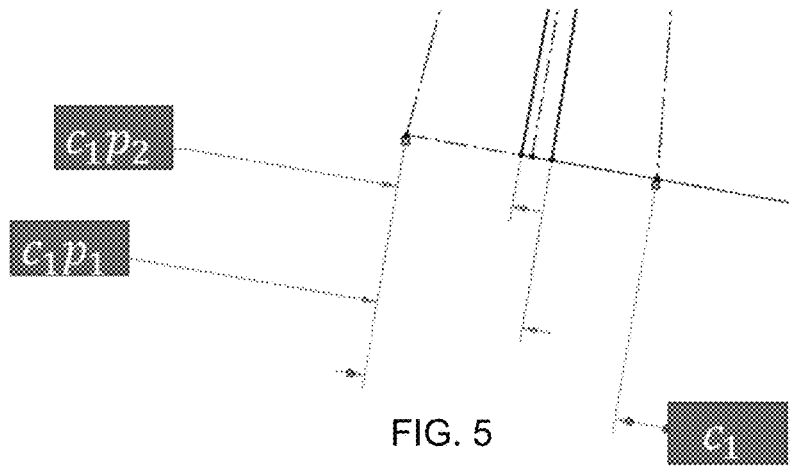
FIG. 5 depicts how image points of the object of FIG. 7 imaged in FIG. 4 are translated onto camera 1 at different points as a function of the camera/scene dependent cameras.
Figure 6:
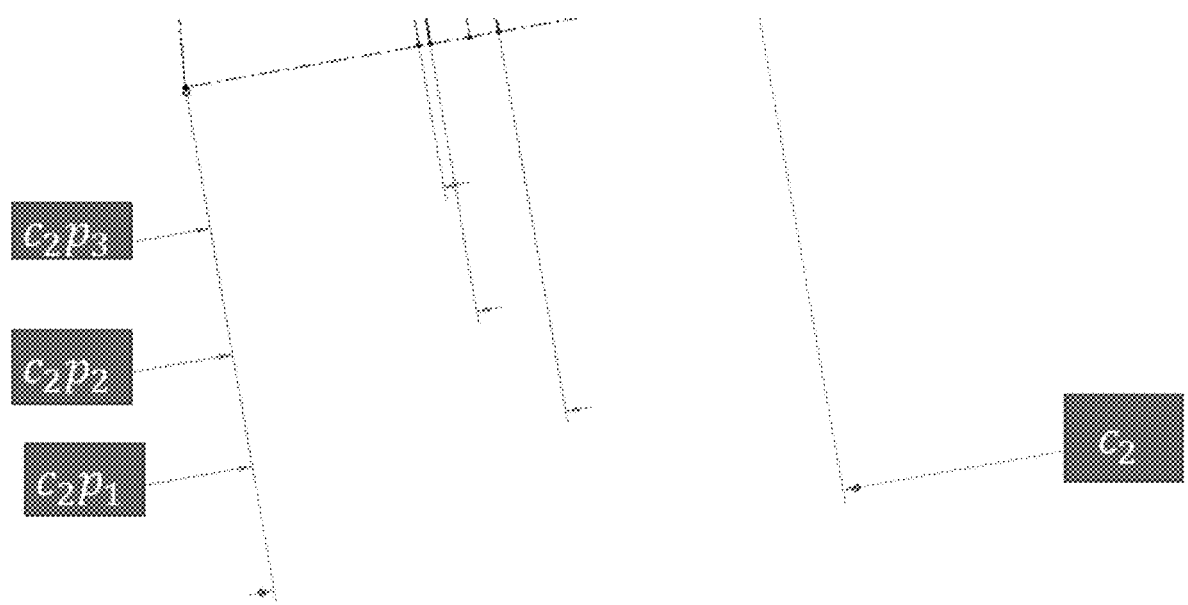
FIG. 6 depicts how image points of the object imaged in FIG. 4 are translated onto camera 2 at different points as a function of the camera/scene dependent cameras.
Figure 7:
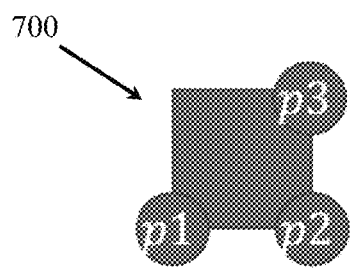
FIG. 7 depicts an example object with three points of interest: p1, p2 and p3.
Figure 8:
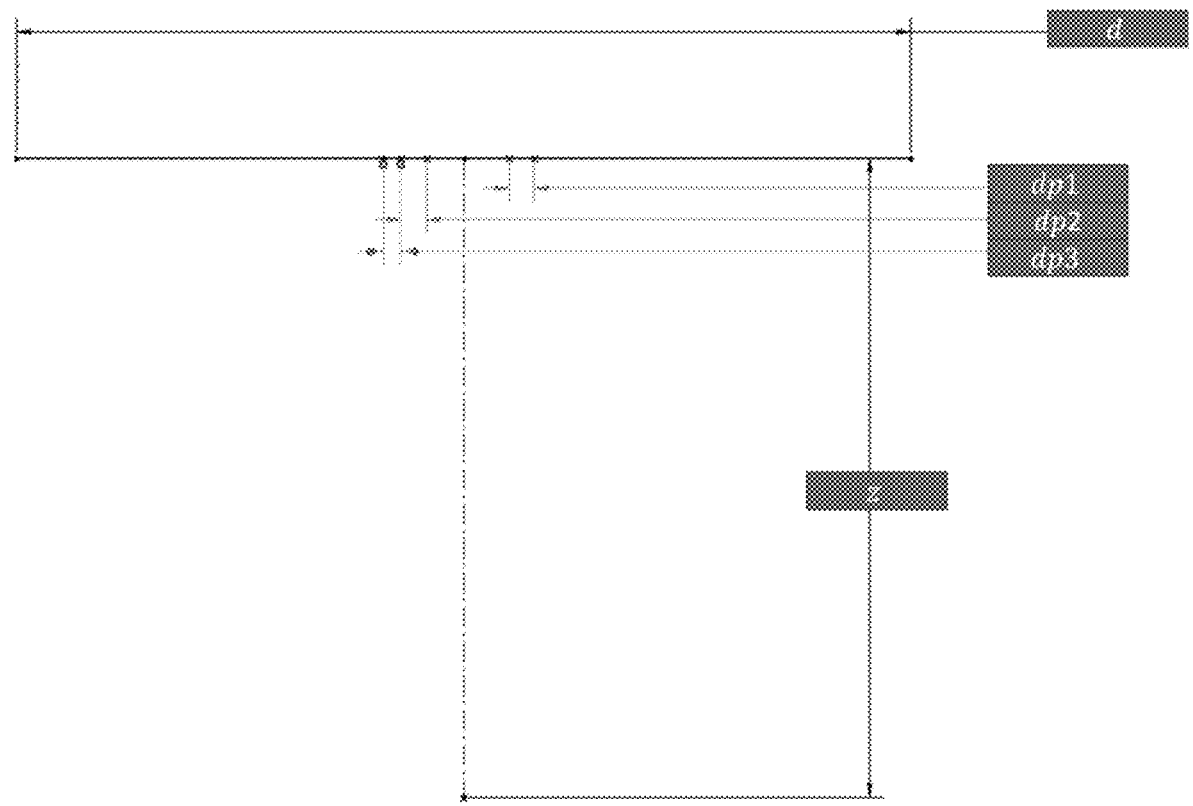
FIG. 8 illustrates the viewing scenario for the imaging depicted in FIG. 4.

FIGS. 4-8 illustrate the imaging of an object 700, which is depicted alone in FIG. 7.

Figure 4:
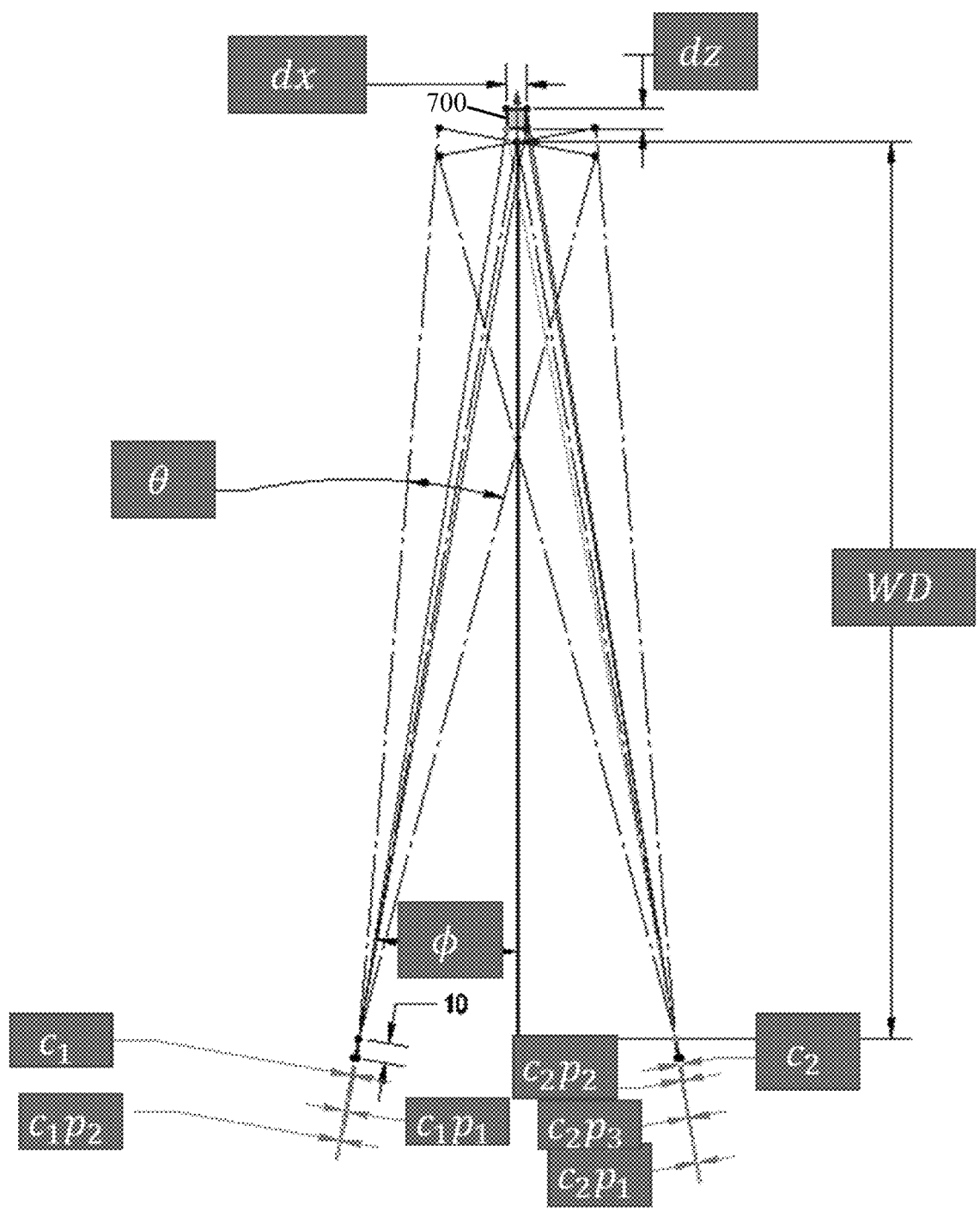
FIG. 4 depicts the stereoscopic imaging of the object depicted in FIG. 7.

The viewing scenario is shown in FIG. 4. The object has three points of interest labelled p1, p2 and p3. Each image point of the object 700 is translated onto the camera at a different point as a function of the camera/scene dependent cameras, as illustrated in FIGS. 5 and 6.

The terms used in FIGS. 4-8 are explained above. The user-dependent parameters are PD (inter-pupil distance), z (distance from the observer to the display screen) and X (user-defined depth comfort), which is the same as HIT discussed above. Decreasing HIT compresses the perception of depth, increasing HIT expands the perception of depth. HIT is applied in the image processor to alter depth perception.

The camera/scene-dependent parameters are the inter-camera distance, the camera fields of view (FOVs), the parallax angle, WD (nominal working distance) and the display field of view (FOV).

In software of the visualization system, the two images are compared as a function of the camera/scene dependent parameters to properly correct for and align the images to a nominal position. This includes keystone correction to account for the different projections of each camera, cropping to ensure the fields of view shown overlap on the image, vertical alignment to correct for out of plane correction, and rotational alignment to correct for camera roll alignment.

The inter-camera distance (ICD) and parallax angle are adjusted in real-time to maintain desired ratios and based on user preferences. The ICD is used to compress or expand the perception of depth. As the camera's ICD is decreased the scene looks more flat. As it expands, the scene appears to have more depth. The ideal inter-camera distance depends on the working distance (distance from lens to sample). As working distance changes, the ICD also changes to maintain the same perception of depth.

The ICD may also be changed to suit user preference (e.g. make it look more three-dimensional or less three-dimensional). It may also be tied to the type of procedure being performed. For example, during a suturing procedure, it may be appropriate to expand the 3D effect to make the task easier and faster.

The parallax angle defines at what "plane" in the image the "Z=0" point is located. In terms of the 3D effect, it defines what "pops out" of the screen vs. what is going into the screen.

For the most comfortable 3D viewing, while a surgeon is performing a procedure using a tool, the system may dynamically change the parallax angle such that the convergence point is at the tip of the tool where the surgeon is operating (i.e. maintaining Z=0 point at the tip of the tool).

The system may include a motorized mechanism to physically move one or both cameras in the lateral direction to adjust the ICD under the control of the control computer, and may include a motorized mechanism to physically rotate one of the cameras to adjust the convergence angle under the control of the control computer. Alternatively, the cameras may be effectively moved and rotated by processing of the digital image frames. This may be done by adjusting one or both of each pair of corresponding image frames from the two cameras so that the frames appear as they would appear if the cameras had been physically moved or rotated. Such an adjustment may be performed by software running on the control computer.

In software the user dependent parameters are fed in with the scene dependent parameters to adjust the horizontal image translation to achieve a comfortable viewing condition. These will balance achieving correct depth ratios (dp3—the distance from p2 to p3) with the total depth budget being used to achieve a given depth as a function of the viewing conditions. There are well defined depth budgets used in broadcast/cinema for comfortable 3D. These seek to minimize the vergence-accommodation conflict. Typical rules of thumb are −1% negative disparity (coming out of the screen) and 2% positive disparity. The percentage is relative to the width of the screen.

In preferred embodiments, the system is tuned to optimize the 3D display for a particular surgeon (user) who will be operating, by performing a pre-surgery calibration/alignment for the surgeon. This can be referred to as a pre-surgery "flight check".

For example the Howard-Dohlman Stereoacuity Test may be used. In this approach, groups of shapes are displayed to the surgeon. In each group, there is one shape with disparity. Disparity increases in each group (i.e. from high positive parallax to high negative parallax) on the screen. From the group with the highest disparity, the user selects the shape that the user can see in 3D. This continues for each group until they cannot see 3D image anymore. From the correctly selected 3D shapes, the user further selects the shape providing the most comfortable 3D view.

The shapes are displayed with the sharpness and brightness, and selected colour as they are used in the operation at the setup time.

The Howard-Dohlman Stereoacuity Test can use surgical images instead of shapes to better determine comfortable viewing as it is the actual images view in surgery.

The range of disparity being displayed can be selected based on viewing distance and inter-ocular separation so that it is within the average disparity range that one can perceive 3D. Disparity, in angle, relates to inter-ocular distance and viewing distance, z, assuming viewing distance, z, is large compared to inter-ocular separation, a, as $\Delta y=(a/z^2)\Delta z$.

It has been reported that about 80% of the population can generally see disparity at at least 30 seconds of arc; 97% are generally able to see a minimum disparity of 2.3 minutes of arc.

The system then adjusts the disparity/parallax according to the test result. If lower than average disparity can be viewed and is considered comfortable, then shorter disparity than standard parameters may be used to provide a more comfortable viewing experience that can allow a longer viewing duration. If higher than average disparity can be viewed and is considered comfortable, then higher disparity than standard parameters may be used to provide comfortable depth perception. The proper disparity level will be determined by the limit at which the surgeon achieves comfortable view depth perception. Surgical images may be used in the test instead of shapes to provide a more accurate and realistic depth representation for measurement.

Calibration for each surgeon may be saved as a profile for the surgeon so that calibration in the next use in the same situation is not necessary. Changing adjust disparity or imaging to optimize for the set viewing angle. The system can be optimized for one surgeon or optimize for more than one. In the case of a main surgeon and a second surgeon, the disparity may be set to a value that is most comfortable for the main surgeon while still viewable for the second surgeon, or the disparity may be set at an average disparity value between the two surgeons, or set at the lower disparity of both so it is most comfortable for both.

Figure 9:
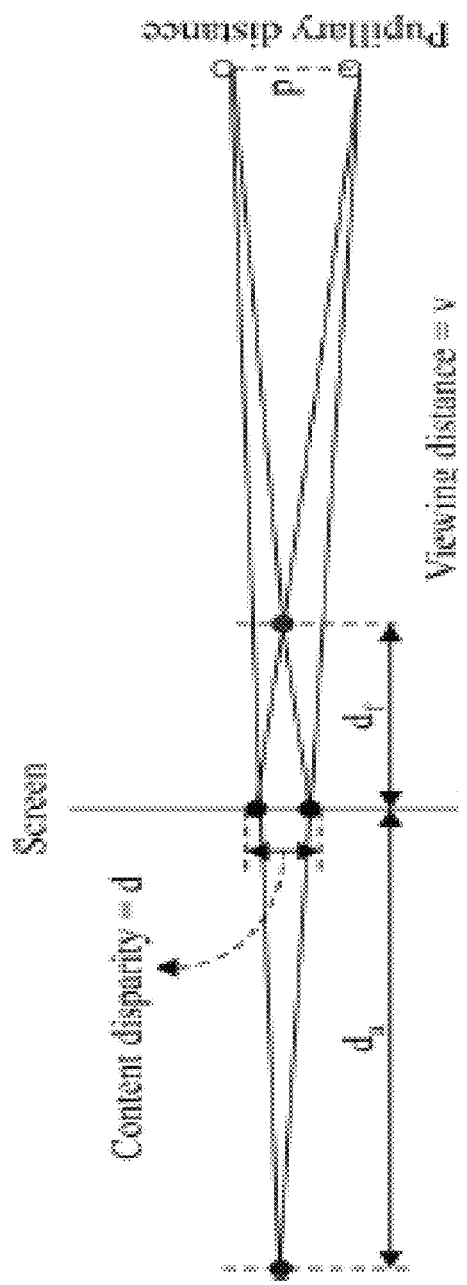
FIG. 9 illustrates the relationship between inter-pupillary distance p, viewing distance v, content disparity d, and depth rage ($d_f$, $d_a$).

As an example, comfortable parallax for average person may be determined according to the relationship with respect to disparity depicted in FIG. 9. Depth range ($d_f$, $d_a$), as defined by the following equations, is the distance of the converged point (virtual object) in front of the screen and behind the screen.

$$d_f = \frac{d-v}{p+d}$$

$$d_a = \frac{d-v}{p-d}$$

Generally, a computer, computer system, computing device, client or server, as will be well understood by a person skilled in the art, includes one or more than one computer processor, and may include separate memory, and one or more input and/or output (I/O) devices (or peripherals) that are in electronic communication with the one or more processor(s). The electronic communication may be facilitated by, for example, one or more busses, or other wired or wireless connections. In the case of multiple processors, the processors may be tightly coupled, e.g. by high-speed busses, or loosely coupled, e.g. by being connected by a wide-area network.

A computer processor, or just "processor", is a hardware device for performing digital computations. A programmable processor is adapted to execute software, which is typically stored in a computer-readable memory. Processors are generally semiconductor based microprocessors, in the form of microchips or chip sets. Processors may alternatively be completely implemented in hardware, with hard-wired functionality, or in a hybrid device, such as field-programmable gate arrays or programmable logic arrays. Processors may be general-purpose or special-purpose off-the-shelf commercial products, or customized application-specific integrated circuits (ASICs). Unless otherwise stated, or required in the context, any reference to software running on a programmable processor shall be understood to include purpose-built hardware that implements all the stated software functions completely in hardware.

While some embodiments or aspects of the present disclosure may be implemented in fully functioning computers and computer systems, other embodiments or aspects may be capable of being distributed as a computing product in a variety of forms and may be capable of being applied regardless of the particular type of machine or computer readable media used to actually effect the distribution.

At least some aspects disclosed may be embodied, at least in part, in software. That is, some disclosed techniques and methods may be carried out in a computer system or other data processing system in response to its processor, such as a microprocessor, executing sequences of instructions contained in a memory, such as ROM, volatile RAM, non-volatile memory, cache or a remote storage device.

A non-transitory computer readable storage medium may be used to store software and data which when executed by a data processing system causes the system to perform various methods or techniques of the present disclosure. The executable software and data may be stored in various places including for example ROM, volatile RAM, non-volatile memory and/or cache. Portions of this software and/or data may be stored in any one of these storage devices.

Examples of computer-readable storage media may include, but are not limited to, recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. The storage medium may be the internet cloud, or a computer readable storage medium such as a disc.

Furthermore, at least some of the methods described herein may be capable of being distributed in a computer program product comprising a computer readable medium that bears computer usable instructions for execution by one or more processors, to perform aspects of the methods described. The medium may be provided in various forms such as, but not limited to, one or more diskettes, compact disks, tapes, chips, USB keys, external hard drives, wire-line transmissions, satellite transmissions, internet transmissions or downloads, magnetic and electronic storage media, digital and analog signals, and the like. The computer useable instructions may also be in various forms, including compiled and non-compiled code.

At least some of the elements of the systems described herein may be implemented by software, or a combination of software and hardware. For example, all the described processing functions may be implemented in software that runs on one or more programmable processors. Elements of the system that are implemented via software may be written in a high-level procedural language such as object oriented programming or a scripting language. Accordingly, the program code may be written in C, C++, J++, or any other suitable programming language and may comprise modules or classes, as is known to those skilled in object oriented programming. At least some of the elements of the system that are implemented via software may be written in assembly language, machine language or firmware as needed. In any case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific and predefined manner in order to perform at least one of the methods described herein.

While the teachings described herein are in conjunction with various embodiments for illustrative purposes, it is not intended that the teachings be limited to such embodiments. On the contrary, the teachings described and illustrated herein encompass various alternatives, modifications, and equivalents, without departing from the described embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Where, in this document, a list of one or more items is prefaced by the expression "such as" or "including", is followed by the abbreviation "etc.", or is prefaced or followed by the expression "for example", or "e.g.", this is done to expressly convey and emphasize that the list is not exhaustive, irrespective of the length of the list. The absence of such an expression, or another similar expression, is in no way intended to imply that a list is exhaustive. Unless otherwise expressly stated or clearly implied, such lists shall be read to include all comparable or equivalent variations of the listed item(s), and alternatives to the item(s), in the list that a skilled person would understand would be suitable for the purpose that the one or more items are listed.

The words "comprises" and "comprising", when used in this specification and the claims, are to used to specify the presence of stated features, elements, integers, steps or components, and do not preclude, nor imply the necessity for, the presence or addition of one or more other features, elements, integers, steps, components or groups thereof.

As used herein, the term "exemplary" or "example" means "serving as an example, instance, or illustration," and should not be construed as preferred or advantageous over other configurations disclosed herein.

As used herein, the terms "about", "approximately", and "substantially" are meant to cover variations that may exist in the upper and lower limits of the ranges of values, such as variations in properties, parameters, and dimensions. In one non-limiting example, the terms "about", "approximately", and "substantially" may be understood to mean plus or minus 10 percent or less.

Unless defined otherwise, all technical and scientific terms used herein are intended to have the same meaning as commonly understood by one of ordinary skill in the art.

As used herein the phrase "intraoperative" refers to an action, process, method, event or step that occurs or is carried out during at least a portion of a medical procedure. Intraoperative, as defined herein, is not limited to surgical procedures, and may refer to other types of medical procedures, such as diagnostic and therapeutic procedures.

What is claimed is:

1. A system for producing three-dimensional (3D) video data, the video data comprising a sequence of 3D image frames at a frame rate for display on a 3D display screen having a location, the system comprising:
a first video camera configured to capture a first sequence of image frames at the frame rate, the first camera having a first field of view having a center and a first axis extending in a forward direction through the center of the first field of view, a second video camera configured to capture a second sequence of image frames at the frame rate, the second video camera being spaced apart from the first camera in a lateral direction perpendicular to the forward direction by an inter-camera distance and having a second field of view substantially overlapping with the first field of view, the second field of view having a second axis at a convergence angle relative to the first axis; and
a control computer operatively connected to the second video camera configured to change the inter-camera distance by effectively moving the second video camera laterally with respect to the first video camera, and to change the convergence angle by effectively rotating the second video camera with respect to the first video camera, wherein the control computer automatically calculates the inter-camera distance and convergence angle based on the distance of a user to the display screen, working distance between the video cameras and an object being imaged, zoom settings of the cameras, and size of the display screen, and effectively moves the second camera accordingly, wherein, for each set of first and second sequences of image frames, the control computer is configured to perform a keystone correction on the image frames to account for the different projections of each camera, rotationally align corresponding image frames in the first and second sequences, combine the corrected and aligned frames to produce a 3D image frame, and display the sequence of 3D image frames on the 3D display screen;

and wherein the user is performing a surgical procedure on a patient and viewing the 3D display screen, and the control computer is further configured to perform a pre-surgery calibration to assess how the user perceives depth, and the calculation of the inter-camera distance and convergence angle is further based on the assessment, and wherein the control computer obtains results of a stereoacuity test performed by the user and automatically adjusts the convergence angle and inter-camera distance to achieve a disparity that is comfortable for the user based on the results of the stereoacuity test.

2. The system of claim 1, wherein the control computer is also operatively connected to the first video camera, and is further configured to change the inter-camera distance by effectively moving the first and second video cameras relative to each other.

3. The system of claim 1, wherein the control computer further calculates the inter-camera distance and convergence angle based on preferences specified by the user.

4. The system of claim 1, wherein the stereoacuity test is a Howard-Dohlman stereoacuity test.

5. The system of claim 1, wherein the control computer administers the stereoacuity test to the surgeon.

6. The system of claim 1, wherein the user is performing a surgical procedure on the patient while viewing the 3D display screen and one of the hands of the user holding a surgical instrument and tissue of the patient being treated using the surgical instrument are visible in the overlapping fields of view of the cameras, the system further comprising a navigation system configured to track the position of the surgical instrument relative to the tissue, and the control computer is further configured to receive real-time information indicating the position of the surgical instrument and optimize the 3D image frames based on the position of the surgical instrument, the position of the surgeon and the location and angle of the 3D display screen.

7. The system of claim 6, wherein the system dynamically changes the convergence angle to maintain a tip of the surgical instrument at a convergence point corresponding to the location and angle of the 3D display screen with respect to the surgeon.

8. The system of claim 1, wherein the control computer effectively moves the second video camera laterally by instructing a motorized mechanism to physically move the second video camera laterally and effectively rotates the second video camera by instructing a second motorized mechanism to physically rotate the second video camera.

9. The system of claim 1, wherein the control computer effectively moves the second video camera laterally by a distance by digitally processing the image frames so that they appear as they would appear if the second camera had been physically moved laterally by that distance.

10. The system of claim 1, wherein the control computer effectively rotates the second video camera by an angle by digitally processing the image frames so that they appear as they would appear if the second camera had been physically rotated by that angle.

11. The system of claim 1, wherein the user is a surgeon.

* * * * *